United States Patent
Gupta et al.

(10) Patent No.: US 9,494,138 B2
(45) Date of Patent: Nov. 15, 2016

(54) VARIABLE SPEED WIND TURBINE, AND A METHOD FOR OPERATING THE VARIABLE SPEED WIND TURBINE DURING A POWER IMBALANCE EVENT

(75) Inventors: Amit Kumar Gupta, Singapore (SG); Gil Lampong Opina, Jr., Singapore (SG);
(Continued)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 795 days.

(21) Appl. No.: 13/390,174

(22) PCT Filed: Aug. 10, 2010

(86) PCT No.: PCT/SG2010/000294
§ 371 (c)(1),
(2), (4) Date: May 14, 2012

(87) PCT Pub. No.: WO2011/019321
PCT Pub. Date: Feb. 17, 2011

(65) Prior Publication Data
US 2012/0217824 A1    Aug. 30, 2012

Related U.S. Application Data

(60) Provisional application No. 61/236,898, filed on Aug. 26, 2009.

(30) Foreign Application Priority Data

Aug. 14, 2009  (DK) .................................. 2009 70084

(51) Int. Cl.
*F03D 9/00* (2016.01)
*F03D 7/02* (2006.01)

(52) U.S. Cl.
CPC .............. *F03D 7/028* (2013.01); *F03D 7/0272* (2013.01); *F03D 9/10* (2016.05);
(Continued)

(58) Field of Classification Search
CPC .......... F03D 7/029; F03D 9/10; F03D 7/0272; F05B 2270/322; F05B 2270/1071; F05B 2270/1016; Y02E 10/723
(Continued)

(56) References Cited

U.S. PATENT DOCUMENTS 6,134,127 A * 10/2000 Kirchberg ........................ 363/41
7,099,800 B2 * 8/2006 Henriksen et al. ........... 702/187
(Continued)

FOREIGN PATENT DOCUMENTS

EP    1819023 A2    8/2007
EP    2270331 A2    1/2011

OTHER PUBLICATIONS

International Search Report and Written Opinion for International Application No. PCT/SG2010/000294 dated Jun. 28, 2011.

*Primary Examiner* — Jean F Duverne
(74) *Attorney, Agent, or Firm* — Patterson + Sheridan LLP

(57) ABSTRACT

A variable speed wind turbine is provided. The wind turbine comprises a generator, a power converter for converting at least a portion of electrical power generated by the generator, an energy management arrangement coupled to the power converter, the energy management arrangement comprises an energy storage unit, and a controller. The controller is adapted to detect a power imbalance event and to transfer at least a portion of excess electrical energy generated by the generator to the energy storage unit to be stored therein when the power imbalance event is detected.

20 Claims, 7 Drawing Sheets

(75) Inventors: Anshuman Tripathi, Singapore (SG); Yugarajan Karuppanan, Singapore (SG); Michael Casem Tumabcao, Singapore (SG)

(52) U.S. Cl.
CPC *F05B 2270/1016* (2013.01); *F05B 2270/1071* (2013.01); *F05B 2270/322* (2013.01); *Y02E 10/723* (2013.01)

(58) Field of Classification Search
USPC .................................. 290/44, 55, 43, 53
See application file for complete search history.

(56) References Cited

U.S. PATENT DOCUMENTS

| | | | |
|---|---|---|---|
| 7,397,142 B1 * | 7/2008 | Cooper | 290/44 |
| 7,411,309 B2 | 8/2008 | Hudson | |
| 8,022,565 B2 * | 9/2011 | Scholte-Wassink et al. | 290/44 |
| 8,076,789 B2 * | 12/2011 | Miller | 290/44 |
| 8,093,741 B2 * | 1/2012 | Ritter et al. | 290/44 |
| 8,294,430 B2 * | 10/2012 | Heier | 322/29 |
| 8,310,074 B2 * | 11/2012 | Larsen et al. | 290/44 |
| 8,466,573 B2 * | 6/2013 | Kikuchi et al. | 290/44 |
| 2005/0062290 A1 | 3/2005 | Stahlkopf | |
| 2007/0073445 A1 * | 3/2007 | Llorente Gonzalez et al. | 700/286 |
| 2007/0109824 A1 * | 5/2007 | Romenesko | 363/41 |
| 2007/0164567 A1 * | 7/2007 | Luetze et al. | 290/44 |
| 2007/0182383 A1 * | 8/2007 | Park et al. | 322/89 |
| 2007/0278797 A1 * | 12/2007 | Flannery et al. | 290/44 |
| 2008/0001408 A1 * | 1/2008 | Liu et al. | 290/44 |
| 2008/0150282 A1 * | 6/2008 | Rebsdorf et al. | 290/44 |
| 2009/0174382 A1 * | 7/2009 | Bucella et al. | 323/282 |
| 2011/0025059 A1 * | 2/2011 | Helle | F03D 9/02 290/44 |

* cited by examiner

VARIABLE SPEED WIND TURBINE, AND A METHOD FOR OPERATING THE VARIABLE SPEED WIND TURBINE DURING A POWER IMBALANCE EVENT

FIELD OF THE INVENTION

The present invention relates generally to a variable speed wind turbine, and in particular, to a method for operating the variable speed wind turbine during a power imbalance event.

BACKGROUND OF THE INVENTION

A wind turbine is an energy converting system which converts kinetic wind energy into electrical energy for utility power grids. Specifically, wind is applied to wind turbine blades of the wind turbine to rotate a rotor. The mechanical energy of the rotating rotor in turn is converted into electrical energy by an electrical generator. Because wind speed fluctuates, the force applied to the wind blades and hence the rotational speed of the rotor can vary. Power grids however require a constant frequency electrical power to be provided by the wind turbine.

One type of wind turbine that provides constant frequency electrical power is a fixed-speed wind turbine. This type of wind turbine requires a generator rotor that rotates at a constant speed. A disadvantage of such fixed-speed wind turbine is that it does not harness all of the wind's energy at high speeds and must be disabled at low wind speeds. Another type of wind turbine is a variable speed wind turbine. This type of wind turbine allows the generator to rotate at variable speeds to accommodate for fluctuating wind speeds. By varying the rotating speed of the generator rotor, energy conversion can be optimized over a broader range of wind speeds.

A variable speed wind turbine usually includes a power converter having a generator side converter coupled to a grid side converter via a direct current (DC) link. The generator side converter regulates the power of the generator. This power passes through the DC-link, fully or partially, and is eventually fed to the grid through the grid side converter.

Conventionally, when there is a fault in the grid, the wind turbine (or wind farm comprising wind turbines) is usually disconnected from the grid to protect the electrical components and mechanical parts of the turbine due to relaxed grid code requirements. Subsequently, when the fault is cleared, the wind turbine is re-connected to the grid again to supply power thereto.

With increasing penetration of wind power generation, the disconnection of wind turbines or wind farms from the grid during grid faults is no longer acceptable by grid operators. This is because the disconnection of a wind turbine/farm under grid fault condition leads to instability of the power grid. Grid operators in many countries now require wind farm operators to comply with certain grid requirements specified in grid codes before they are allowed to connect to the grid. Grid requirements vary in different countries, but they have a common aim of permitting the development, maintenance and operation of a coordinated, reliable and economical transmission or distribution system. For example, grid codes typically require that wind turbines should be able to ride-through a fault causing the voltage at a Point of Common Coupling at a wind farm to decrease to, for example 0.2 pu with duration of 0.5 seconds.

U.S. Pat. No. 6,921,985 discloses the use of a shunt circuit or a crowbar circuit to shunt the sudden surge of current during a grid fault, such as a voltage dip. The crowbar circuit is coupled to a point between the generator side converter and the generator rotor. When a sudden increase in the current at the generator side converter is detected, the crowbar circuit is activated, and the current is drained from the generator side converter by the crowbar circuit.

U.S. Pat. No. 7,411,309 also discloses the use of a crowbar circuit during voltage transients at the grid. The crowbar circuit is coupled to the DC link between the generator side converter and the grid side converter. When the DC link voltage exceeds a predetermined value (due to grid fault), the crowbar circuit is activated to drain the current from the generator side converter, hence lowering the DC link voltage.

In both the prior art documents, the shunt circuits use resistors to drain any undesired surge of current or dissipate any excess power generated due to grid fault. As the power output of the wind turbines are large, the shunt circuit need to use high mega joules resistors in order to dissipate excess power from the generator. In addition, the heat generated by the power dissipating resistors needs to be handled. This may require cooling for the power dissipating resistors.

It is thus an object of the invention to provide an improved energy handling circuits for managing excess power from the wind turbine without the disadvantages mentioned above.

SUMMARY OF THE INVENTION

According to a first aspect of the invention, a variable speed wind turbine is provided. The wind turbine comprises a generator, a power converter for converting at least a portion of electrical power generated by the generator, an energy management arrangement coupled to the power converter, the energy management arrangement comprises an energy storage unit, and a controller. The controller is adapted to detect a power imbalance event and to transfer at least a portion of excess electrical energy generated by the generator to the energy storage unit to be stored therein when the power imbalance event is detected. The power imbalance event includes at least one of the following: a fault event and a wind gust event.

The generator is an electromechanical machine capable of converting mechanical energy from the wind into electrical energy. The generator used in the wind turbine could be any types of generator including but not limited to, a permanent magnet generator, doubly-fed induction generator and squirrel cage induction generator. A portion or all of the electrical power generated by the generator is converted by the power converter into a fixed frequency electrical power suitable to be supplied to a power grid.

The energy management arrangement includes the energy storage unit for storing energy. It may also include other components such as circuitries for the energy storage unit, for example, one or more switches for activating or de-activating the energy storage unit.

The controller is adapted to detect a power imbalance event. In a normal operation of the wind turbine, the electrical power generated by the generator is supplied to the power grid via the power converter. The power imbalance event is any event that disrupts the balance of the electrical power in the wind turbine, such as when the electrical power generated by the generator exceeds the power that can be supplied to the power grid. This results in an excess electrical power being generated.

Excess electrical power or energy may be generated due to a fault event, such as a fault in the grid or a grid in the wind turbine (e.g. converter fault). For example, when there is a voltage dip in the power grid, not all the electrical power generated can be delivered to the power grid, resulting in electrical power imbalance. Also if the converter in the wind turbine is faulty, it is unable to supply the electrical power generated to the power grid. This also results in electrical power imbalance. Such electrical power imbalance results in excess electrical energy in the wind turbine.

Excess electrical power or energy may also be generated when there is a sudden increase in wind speed (i.e. a wind gust event). Normally, when the wind speed increases, the electrical power generated by the generator may be controlled to match the power for supplying to the power grid. Such power control can be achieved using pitch or generator control. However when the increase in speed is sudden, for example when there is a wind gust, the pitch or generator control may not be able to control the power generated in a short time. This also results in excess electrical power or energy been generated.

The controller is thus adapted to detect such situations which can result in excess electrical energy been generated. According to the embodiment, this excess electrical energy is stored in the energy storage unit instead of being dissipated away. For example when the energy management arrangement includes one or more switches for activating the energy storage unit, the controller may control the switch to activate the energy storage unit to store the excess energy when the power imbalance event has been detected.

The controller may detect the power imbalance event in a number of ways. For example, the controller may detect the grid voltage within the turbine or at the wind farm level to determine whether there is any voltage dip. Other examples that the controller can detect power imbalance events include detecting the voltage at a DC-link (direct current link) of the power converter, current level in the power converter, rotor speed, wind speed using a wind anemometer, etc.

According to the present invention, high mega joules resistors located in power converters for dissipating excess power are not required. As resistors generate heat when dissipating power, cooling is required to remove the heat generated by these resistors. According to the present invention, such cooling is now not necessary. In addition, better energy management can be obtained by storing the excess electrical energy instead of dissipating it away. The stored electrical energy can be harnessed for other uses, for example, to help the wind turbine to deliver electrical power to the power grid immediately after the grid recovers from the voltage dip, or for powering other critical components in the wind turbine.

According to an embodiment, the energy storage unit includes at least one of an electrical, chemical, mechanical or electrostatic storage arrangement for storing the excess electrical energy. As an example, a high voltage ultracapacitor bank (e.g. 750 V or higher) may be used. It is also possible to use a single capacitor for storing the excess electrical energy. Other examples of the energy storage unit includes but not limited to pumped storage, Compressed Air Energy Storage (CAES), flow batteries, Li-Ion batteries, Ni—Cd, Lead Acid, Metal-air batteries, Flywheel and Superconducting Magnetic Energy Storage (SMES).

According to an embodiment, the power converter is adapted to convert a full amount of electrical power generated by the generator. In other words, all the electrical power generated by the generator is converted by the power converter into the fixed frequency electrical power to be supplied to the power grid. In another embodiment, the power converter handles a portion of the electrical power generated by the generator. In this embodiment of partial power conversion, the generator may be a doubly fed induction generator (DFIG). The stator windings of the generator are coupled to the grid directly, and the rotor windings of the generator are coupled to the grid via the power converter which converts a portion of the generated electrical power.

According to an embodiment, the power converter includes a generator-side converter which converts AC (alternating current) voltage and current from the generator to DC (direct current) voltage and current, a grid side converter which converts the DC voltage and current to an AC voltage and current, and a DC link between the generator-side converter and the grid-side converter. The energy management arrangement is coupled to the DC link for receiving the excess electrical energy to be stored therein during the power imbalance event. In this embodiment, the DC voltage at the DC link directly charges the energy storage unit. The energy storage unit may operate at a different voltage from the DC link voltage. In a further embodiment, the energy management arrangement includes a DC-to-DC converter for converting the DC voltage at the DC link to a DC voltage suitable for the energy storage unit.

According to another embodiment, the energy management arrangement is coupled to an input of the generator-side converter for receiving the excess energy to be stored therein during the power imbalance event. Specifically, the energy management arrangement is coupled to a point between the generator and the power converter. In a full power conversion arrangement, the energy management arrangement is coupled to the stator windings of the generator. In a partial power conversion arrangement, the energy management arrangement is coupled to the rotor windings of the generator. In this embodiment, the energy storage unit is charged directly by the AC voltage at the input of the power converter. The energy storage unit may operate with a DC voltage instead of an AC voltage. In a further embodiment, the energy management arrangement includes an AC-to-DC converter for converting the AC voltage at the input of the power converter to a DC voltage suitable to be processed by the energy storage unit.

According to a further embodiment, the energy management arrangement is coupled to the input of the generator-side converter and another energy management arrangement is coupled to the DC link of the power converter. In other words, there are two separate energy management arrangements coupled to the power converter for receiving the excess energy during the power imbalance event.

In an embodiment, the energy management arrangement further includes a power dissipating element for dissipating at least a portion of excess energy generated by the generator during the power imbalance event. The excess energy generated during the power imbalance event may exceed the capacity of the energy storage unit, resulting in remaining excess energy not stored in the energy storage unit. According to the embodiment, such remaining excess energy can be dissipated off as power loss by the power dissipating element. The power dissipating element need not be as large as those provided in the prior art, because it need not dissipate the full amount of excess power, but only a portion of the excess energy such as the remaining excess energy not stored by the energy storage unit.

In a further embodiment, the power dissipating element includes a resistor. In an embodiment, the power dissipating element is connected in parallel with the energy storage unit.

It is also possible that the power dissipating element is connected in series with the energy storage unit.

In an embodiment, the wind turbine further includes an uninterrupted power supply (UPS) coupled to the energy management arrangement. The UPS receives electrical energy from the energy management arrangement to be stored therein. In addition to being charged by the power grid, the UPS can also be charged by the energy management arrangement, and hence, by the excess electrical power generated during the power imbalance event. The energy stored in the UPS by the energy management arrangement can be used to power auxiliary components in the wind turbine.

In an embodiment, the energy management arrangement is adapted to supply electrical power to auxiliary components in the wind turbine during the power imbalance event. Instead of powering the auxiliary components using the UPS, the energy management arrangement may also power the auxiliary components directly.

According to a second aspect of the invention, a method for operating a variable wind turbine is provided. The method comprises detecting a power imbalance event, and storing at least a portion of excess electrical energy generated by the generator in an energy management arrangement when the power imbalance event is detected. The power imbalance event may include a fault event or a wind gust event in an embodiment. When the amount of excess electrical energy generated during the power imbalance event is more than the capacity of an energy storage unit of the energy management arrangement, the remaining amount of excess electrical energy is dissipated off as power loss by a power dissipating element in an embodiment.

In an embodiment, the electrical energy stored in the energy management arrangement is used to charge an UPS. The electrical energy stored in the energy management arrangement may also be used to power auxiliary components in the wind turbine.

It should be noted that a person skilled in the art would readily recognize that any feature described in combination with the first aspect of the invention could also be combined with the second aspect of the invention, and vice versa.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
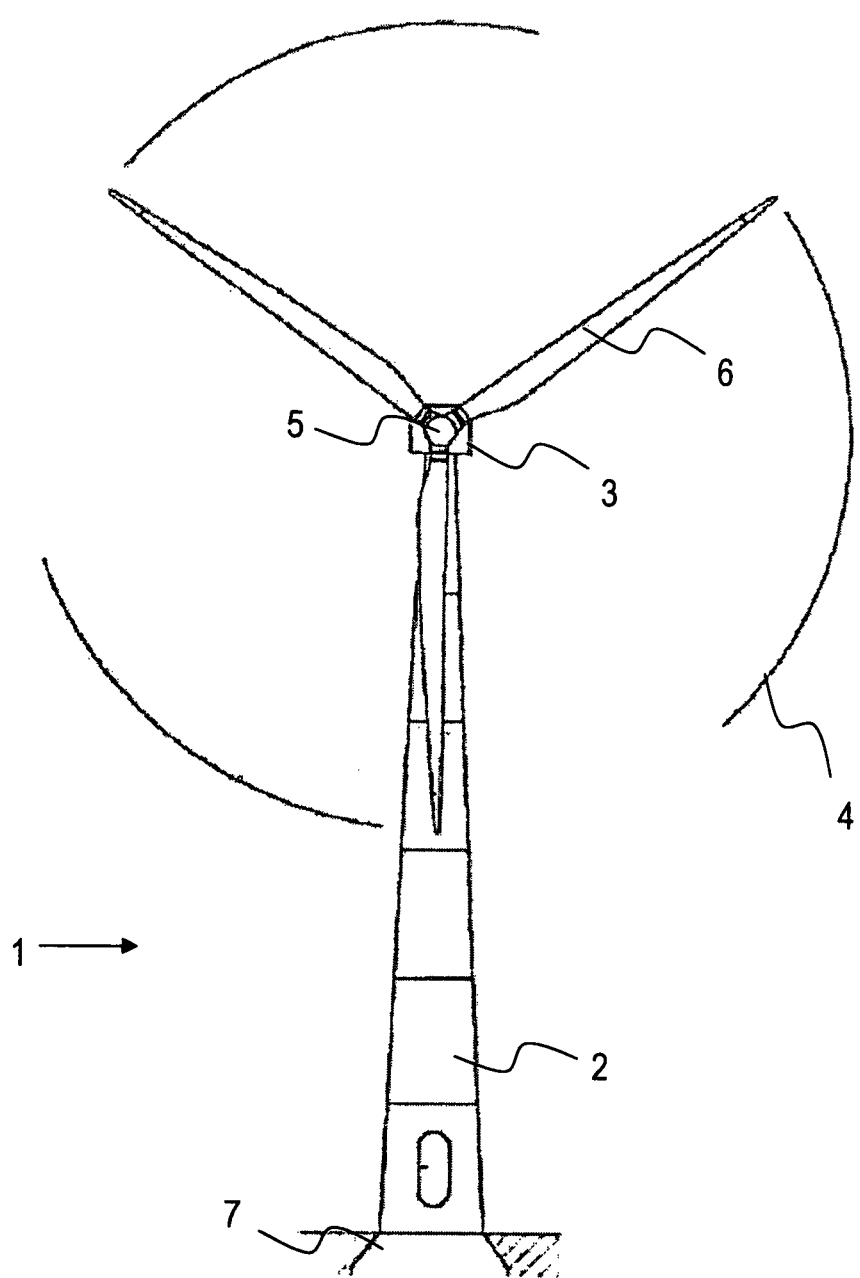
FIG. 1 shows a general structure of a wind turbine.

FIG. 1 shows a general setup of a wind turbine 1. The wind turbine 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine may also form part of a wind farm comprising a plurality of wind turbines. All the electrical power generated by the individual wind turbines in the wind farm are consolidated and supplied to the power grid via a Point of Common Coupling (PCC).

Although the wind turbine 1 shown in FIG. 1 has three blades 6, it should be noted that a wind turbine may have different number of blades. It is common to find wind turbines having two to four blades. The wind turbine 1 shown in FIG. 1 is a Horizontal Axis Wind Turbine (HAWT) as the rotor 4 rotates about a horizontal axis. It should be noted that the rotor 4 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

Figure 2:
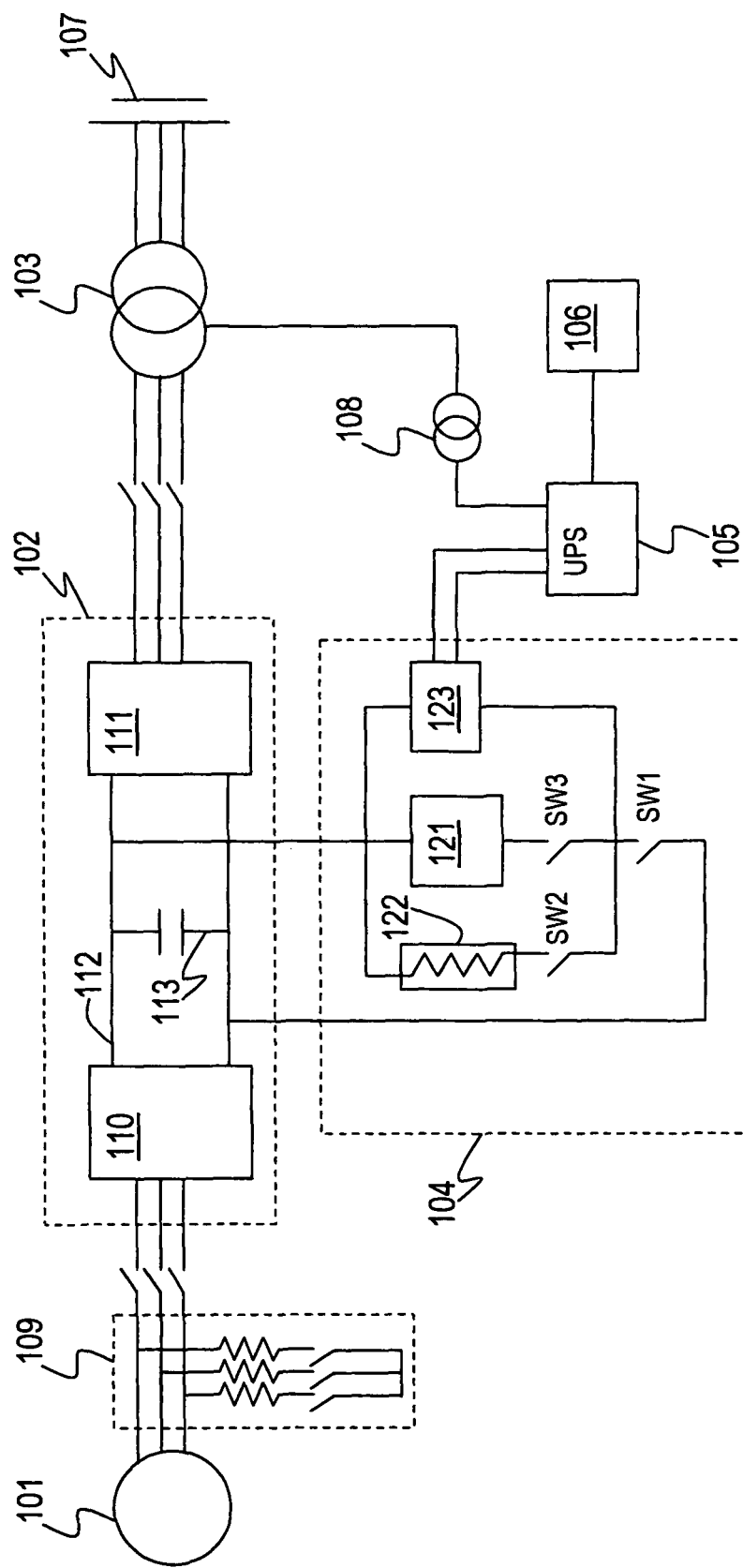
FIG. 2 shows a first electrical system layout of the wind turbine according to an embodiment.

FIG. 2 shows an electrical system of the wind turbine according to an embodiment. The electrical system includes a generator 101, a power converter 102, a main transformer 103, an energy management arrangement 104, an uninterrupted power supply (UPS) 105 and turbine auxiliary components represented by block 106. The power converter 102 includes a generator-side converter 110 and a grid-side converter 111 connected via a direct current (DC) link 112. The DC link 112 includes a DC link capacitor 113.

The generator 101 converts mechanical energy to electrical energy having AC (alternating current) voltage and current (collectively referred to as "AC signals"), and provides the generated AC signals to the generator-side converter 110. The AC signals from the generator have a variable frequency, due to varying wind. The generator-side converter 110 converts or rectifies the AC signals to a DC (direct current) voltage and a DC current (collectively know as "DC signals") which is placed on the DC link 112. The grid-side converter 111 converts the DC signals on the DC link 112 into fixed frequency AC signals for a power grid 107. The power comprising the fixed frequency AC signals at the output of the grid-side converter 111 is stepped up by the main transformer 103 into a level suitable for to be received and transmitted by the power grid 107. The UPS 105 receives power via an auxiliary transformer 108, and supplies power to auxiliary components 106 in the wind turbine.

It should be noted that the electrical system described with reference to FIG. 2 is only an example of the electrical configuration of the wind turbine and only the main components are shown to illustrate the embodiments. The present invention should not be limited to the exact electrical system configuration shown in FIG. 2. Other electrical configurations are possible. Also, many components in the electrical system of the wind turbine are not shown in FIG. 2. For example, the electrical system may include filters between the generator 101 and the power converter 102, and between the power converter 102 and the main transformer 103. Also, there may be switches (some of which are shown in FIG. 2) arranged at various locations for connecting or disconnecting certain components of the turbine. Controllers for controlling the converters 110, 111 are also not shown in FIG. 2. Also shown in FIG. 2 is an AC dump load 109 for dissipating power from the generator 101 and/or the generator-side converter 110 in event of, for example, a fault in the generator 101 or the generator-side converter 110.

The energy management arrangement 104 in FIG. 2 is coupled to the DC link 112 of the power converter 102. The energy management arrangement 104 includes an energy storage unit 121, a power dissipating resistor 122, a DC-to-DC voltage converter 123 and three switches labeled as SW1, SW2 and SW3. The switches SW1, SW2, SW3 can be operated in such a manner that the DC link 112 is connected to the energy storage unit 121, the resistor 112, the converter 123 or a combination thereof. The UPS 105 is connected to the converter 123 of the energy management arrangement 104.

The operation of the wind turbine according to an embodiment will now be described with reference to the electrical system shown in FIG. 2. During normal operation of the wind turbine, the electrical power generated by the generator is converted by the power converter 102 into power having fixed frequency AC signals to be supplied to the power grid 107. The switches SW1, SW2 and SW3 are open, and hence no power flows into the energy management arrangement 104. A controller (not shown) constantly detects whether there is a power imbalance event which cause the power flow from the generator to the grid to be imbalanced. As mentioned earlier, the power imbalance event may be a voltage dip in the power grid 107 (low voltage or grid fault event), a converter fault (turbine fault event) or when there is a sudden wind gust causing a sudden increase in the rotational speed of the blades of the wind turbine (wind gust event). The grid fault event and turbine fault event may be collectively known as fault event. These events result in the electrical power generated by the generator 101 to be more than the power supplied to the power grid 107, resulting in excess electrical power or energy.

Excess electrical power if not transferred to the grid or dissipated properly will lead to an increase in DC-link 112 voltage. In an induction generator, the current at the rotor also increases during power imbalance event. This is because during low voltage event, more active power is pumped from rotor circuit into the generator side converter. Therefore, the controller may detect a power imbalance event by determining whether the voltage at the DC link 112 increases above a predetermined threshold level. If the voltage at the DC link 112 is determined to be above the predetermined threshold level, a power imbalance event is detected. Alternatively or additionally, the controller may also determine a current level at the DC link 112 or at the input of the generator-side converter 110. If the current level is above a predetermined threshold level, the power imbalance event is detected.

The controller may also sense the voltage at the output of grid side converter 111 or at the power grid 107 directly, for example, at the PCC (not shown) to the power grid 107 to determine whether there is any voltage dip which results in the power imbalance event. It is also possible to determine whether a wind gust event has occurred by determining the wind speed or rotational speed of the rotor. Wind speed may be determined using wind anemometers commonly placed on top of the nacelle of the turbine. When the wind speed is determined to have increased substantially over a short period of time, a wind gust event is detected.

When the controller has detected the power imbalance event using any of the methods described above, it activates the energy management arrangement 104. The energy management arrangement 104 can be activated by closing the switches SW1 and SW3. As a result, the excess electrical power generated is directed to the energy management arrangement 104 and charges the energy storage unit 121. In this embodiment, the voltage at the DC link 112 is able to charge the energy storage unit 121 directly. If the energy storage unit 121 operates at a different voltage from the DC link voltage, a DC-to-DC converter may be used to first convert the DC link voltage into a suitable DC voltage level suitable for charging the energy storage unit 121. This arrangement is shown in the electrical system of FIG. 3.

When the energy storage unit 121 is fully charged, the remaining excess electrical energy may be dissipated off in the resistor 122 as power loss. To activate the power dissipating resistor 122, the controller closes the switch SW2 and opens SW3. During the power imbalance event, the UPS 105 may also be charged by the excess power from the DC link 112 or by the energy stored in the energy storage unit 121 via the converter 123. Additionally, the AC dump load 109 may also be activated to dissipate a part of the excess electrical power.

After the power imbalance event is over, the power stored in the energy storage unit 121 may be used to supply active power to the power grid 107. This is especially helpful when the power imbalance event is due to a low voltage event at the power grid 107. The fast restoration of active power from the energy storage unit 121 enables the turbine to help the grid to recover from the grid fault quickly and helps to meet grid compliance. The energy storage unit 121 may also continue to supply power to charge the UPS 105 after the power imbalance event by operating the switches SW1, SW2 and SW3. The UPS 105 may be used to power auxiliary components 106. The operation of the switches SW1, SW2 and SW3 during and after the power imbalance event is controlled by the controller.

It should be noted that the generator 101 and the power converter 102 are usually placed inside the nacelle of the turbine. The main transformer 103, the energy management arrangement 104 and/or the UPS 105 may also be placed inside the nacelle or outside the nacelle, for example in the tower or at the based of the turbine. The auxiliary components 106 include lightings, fans, cooling units, power supplies, pumps etc, and may be arranged in any parts of the turbine. As mentioned earlier, the energy storage unit 121 may be any types of energy storage system including but not limited to chemical, mechanical, electrical & electronics, hydraulic storage or their combinations. Some examples are ultra-capacitor banks, flow batteries, Metal-air batteries, NaS, Li-Ion, Ni—Cd, Lead Acid, Flywheel, CAES, SMES, fuel cell and pumped storages, or combination thereof.

Figure 3:
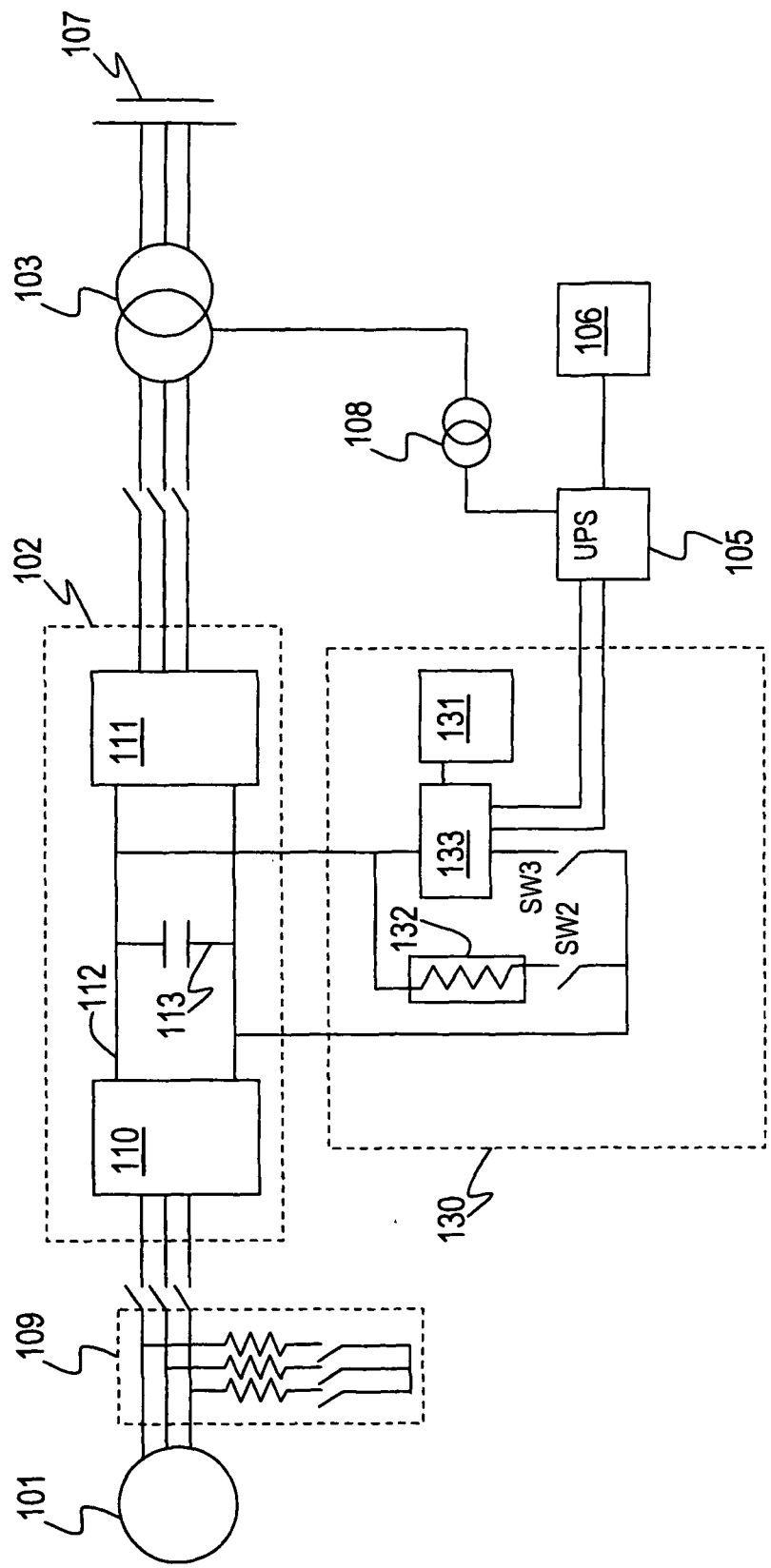
FIG. 3 shows a second electrical system layout of the wind turbine according to an embodiment.

FIG. 3 shows another electrical system of the wind turbine according to an embodiment. The electrical system in FIG. 3 is similar to that shown in FIG. 2, except for the configuration of the energy management arrangement 130. The energy management arrangement 130 in FIG. 3 also includes an energy storage unit 131, a power dissipating resistor 132 and a DC-to-DC converter 133. In this embodiment, the DC-to-DC converter 133 is used to convert the DC voltage at the DC link 112 into a suitable DC voltage for charging the energy storage unit 131 and the UPS 105.

During the power imbalance event, switch SW3 is closed and the voltage at the DC link 112 is converted by the DC-to-DC converter 133 to the suitable DC voltage for charging the energy storage unit 131. At the same time, the DC-to-DC converter 133 may also charge the UPS 105. When the energy storage unit 131 is fully charged, the remaining electrical energy can be dissipated through the resistor 132. This is done by closing the switch SW2 and opening SW3.

Similarly when the power imbalance event is over, the energy stored in the energy storage unit 131 may be used to supply active power to the power grid 107. The energy storage unit 131 may also continue to supply power to charge the UPS 105 after the power imbalance event by operating the switches SW2 and SW3. The UPS 105 may be used to power auxiliary components 106. The operation of the switches SW2 and SW3 during and after the power imbalance event may be controlled by the controller (not shown).

Figure 4:
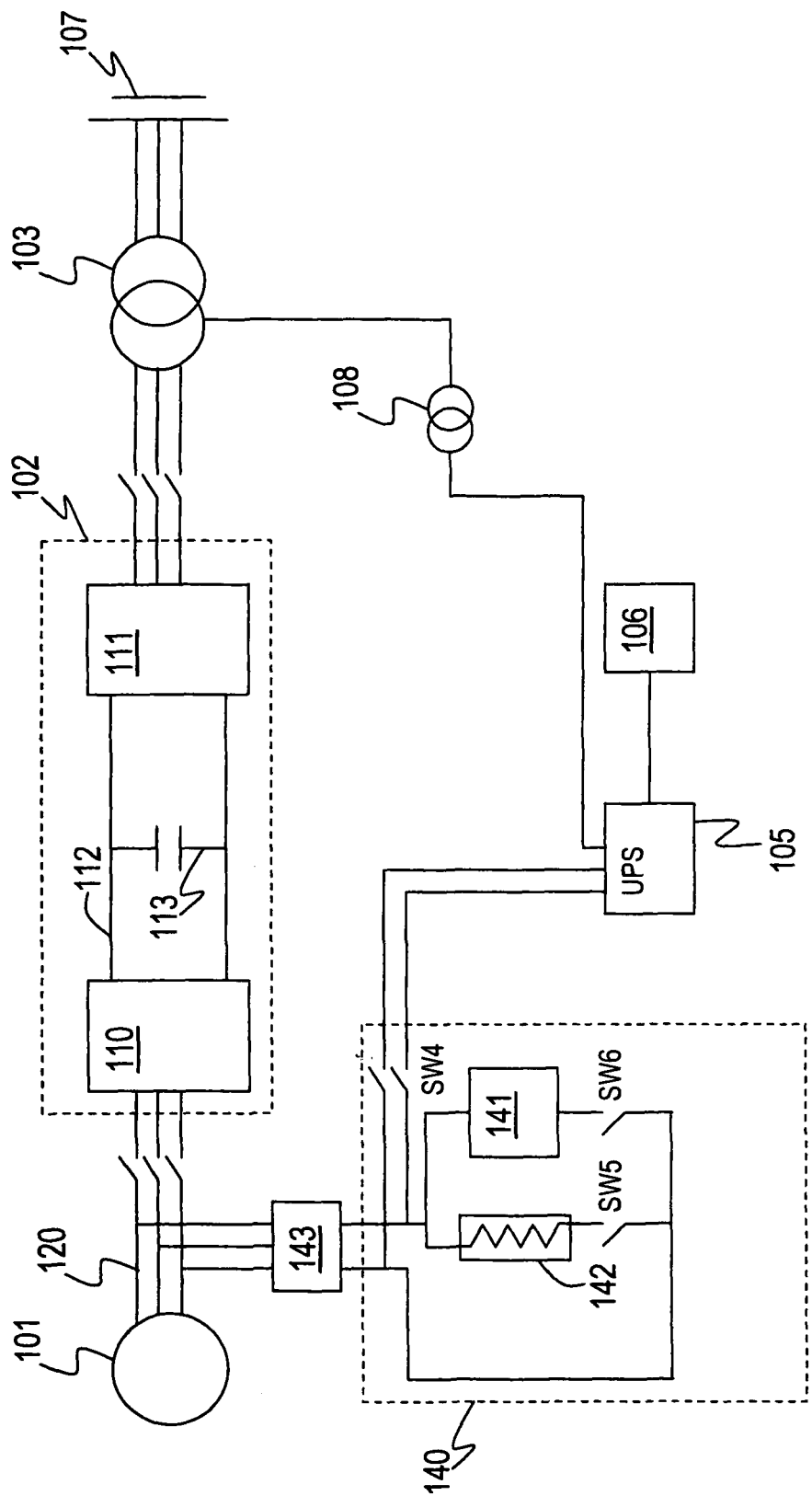
FIG. 4 shows a third electrical system layout of the wind turbine according to an embodiment.

FIG. 4 shows another electrical system of the wind turbine according to an embodiment. The electrical system in FIG. 4 is similar to that shown in FIG. 2 and FIG. 3, except for the configuration of the energy management arrangement 140 and the coupling of the energy management arrangement 140 to the power converter 102. In the electrical system in FIG. 4, the energy management arrangement 140 is coupled to the input of the power converter 102. Specifically, the energy management arrangement 140 is coupled to the stator windings 120 of the generator 101.

The electrical system in FIG. 4 includes an AC-to-DC converter 143 for converting the AC voltage at the input of the power converter 102 into DC voltage as input to the energy management arrangement 140. The energy management arrangement 140 in FIG. 4 includes an energy storage unit 141, a power dissipating resistor 142, and switches SW4, SW5 and SW6. In this embodiment, DC voltage from the AC-to-DC converter 143 is used to charge the energy storage unit 141 and the UPS 105.

During the power imbalance event, switch SW6 is closed and the AC signals at the input of the power converter 102 are converted by the AC-to-DC converter 143 to DC voltage for charging the energy storage unit 141. At the same time, the converted DC voltage may also charge the UPS 105 by closing switch SW4. When the energy storage unit 141 is fully charged and there is still remaining excess electrical energy, the remaining excess energy is dissipated as power loss through the power dissipating resistor 142. This is done by closing the switch SW5 and opening SW6.

When the power imbalance event is over, the energy stored in the energy storage unit 141 may continue to supply power to charge the UPS 105 by operating the switches SW4, SW5 and SW6. The UPS 105 may be used to power auxiliary components 106. The operation of the switches SW4, SW5 and SW6 during and after the power imbalance event may be controlled by the controller (not shown).

In this embodiment, the DC voltage from the AC-to-DC converter 143 is able to charge the energy storage unit 141 and the UPS 105 directly. If the UPS 105 operates at a different voltage from the DC voltage from the AC-to-DC converter 143, a DC-to-DC converter may be used to convert the DC voltage from the AC-to-DC converter 143 into a suitable DC voltage level suitable for charging the UPS 105 in an alternative embodiment.

Figure 5:
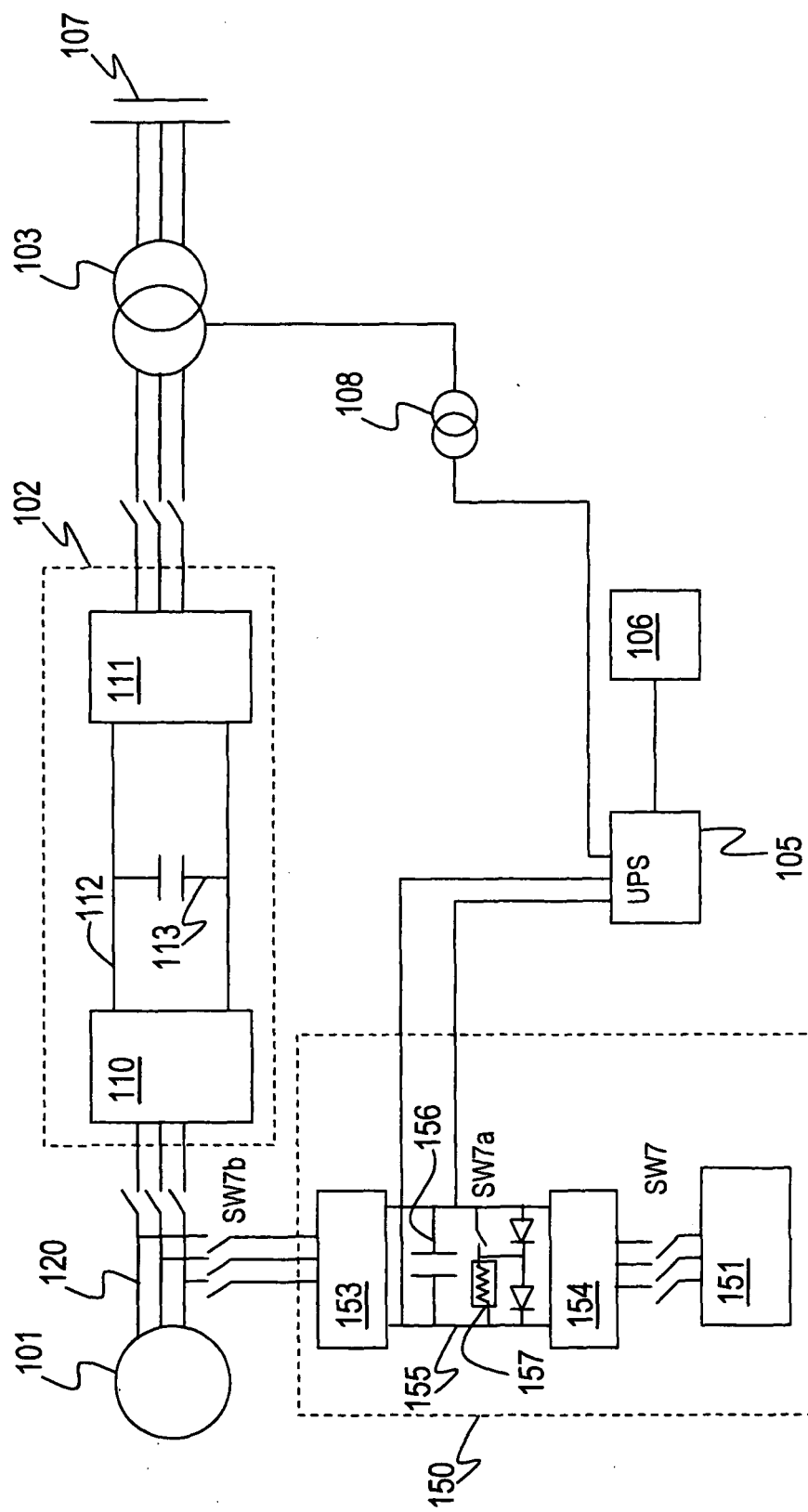
FIG. 5 shows a fourth electrical system layout of the wind turbine according to an embodiment.

FIG. 5 shows another electrical system of the wind turbine according to an embodiment. In the electrical system in FIG. 5, the energy management arrangement 150 is coupled to the input of the power converter 102. Specifically, the energy management arrangement 150 is coupled to the stator windings 120 of the generator 101.

The energy management arrangement 150 in FIG. 5 also includes an energy storage unit 151, an AC-to-DC converter 153, a DC-to-AC converter 154, a DC link 155, a DC link capacitor 156, a power dissipating resistor 157 and switches SW7, SW7a and SW7b. In this embodiment, the energy storage unit 151 may be a storage device which is charged using a fixed frequency AC voltage. An example of such a storage device includes a flywheel. A flywheel is a device having significant moment of inertia used for storing rotational energy.

The AC-to-DC converter 153 converts the AC voltage at the input of the power converter 102 into DC voltage, and the DC-to-AC converter 154 converts the DC voltage into AC voltage for charging the energy storage unit 151. The DC voltage at the DC link 155 is also used to charge the UPS 105.

During the power imbalance event, switches SW7b and SW7 are closed and the AC voltage at the input of the power converter 102 is converted by the AC-to-DC converter 153 and the DC-to-AC converter 154 into a fixed frequency AC voltage for charging the energy storage unit 151. At the same time, the DC voltage at the DC link 155 may also charge the UPS 105. When the energy storage unit 151 is fully charged, the remaining excess electrical energy may be dissipated off in the resistor 157 as power loss. To activate the power dissipating resistor 157, the controller closes the switch SW7a and opens SW7.

When the power imbalance event is over, the energy stored in the energy storage unit 151 may continue to supply power to charge the UPS 105 by closing the switches SW7. The UPS 105 may be used to power auxiliary components 106. The operation of the switches SW7, SW7a and SW7b during and after the power imbalance event may be controlled by the controller (not shown).

Figure 6:
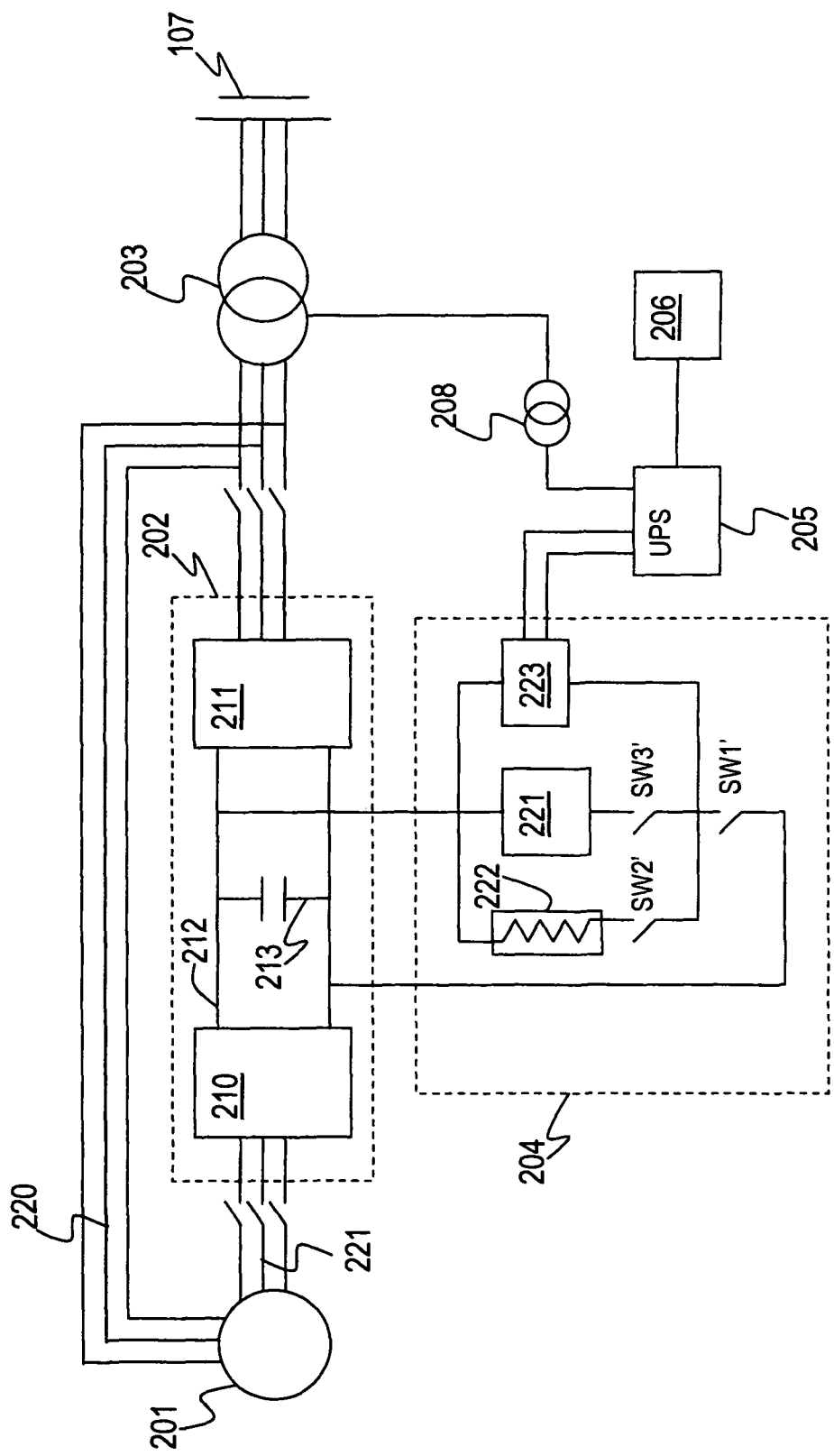
FIG. 6 shows a fifth electrical system layout of the wind turbine according to an embodiment.

FIG. 6 shows an electrical system of the wind turbine using a doubly fed induction generator (DFIG) 201 according to an embodiment. The electrical system of the wind turbine in FIG. 6 includes the DFIG generator 201, a power converter 202, a main transformer 203, an energy management arrangement 204, an UPS 205 and turbine auxiliary components represented by block 206. The power converter 202 includes a generator-side converter 210 and a grid-side converter 211 connected via a DC link 212. The DC link 212 includes a DC link capacitor 213. The power converter 202, the main transformer 203, the energy management arrangement 204, the UPS 205 and the auxiliary components 206 are similar to those already explained with reference to FIG. 1, and will not be described here.

The generator 201 includes both stator windings 220 and rotor windings 221. The power converter 202 is coupled to the rotor windings 221 of the generator 201, and converts a portion of the electrical power generated by the generator 201 and supply to the grid. The power converter 202 also converts the electrical power from the generator at the rotor windings to a reactive power to maintain a desired power factor at the grid. The stator windings 220 of the generator 201 are coupled to the power grid 107 through the main transformer 203. In this arrangement, depending on the mode of operation of the turbine, power can flow from the power grid 107 to the rotor windings 221 to operate the generator 201, or power can flow from the rotor windings 221 to the power grid 107 to supplement power from the stator windings 220.

The energy management arrangement 204 shown in FIG. 66 is similar to the energy management arrangement 104 described with reference to FIG. 2. It is also possible to use the energy management arrangement 130 described with reference to FIG. 3 in the electrical system shown in FIG. 6 in another embodiment. The energy management arrangement 204 is coupled to the DC link 212 of the power converter 202. The energy management arrangement 204 includes an energy storage unit 221, a power dissipating resistor 222, a DC-to-DC voltage converter 223 and three switches labeled as SW1', SW2' and SW3'. The functions of the components in the energy management arrangement 204 are similar to that of the energy management arrangement 104 in FIG. 2, and will not be described here. The UPS 205 is connected to the voltage converter 223 of the energy management arrangement 204.

During normal operation of the wind turbine at below synchronous speed, the electrical power generated by the generator is supplied to the power grid 107 via the stator windings 220. The grid-side converter 211 converts the AC signals from the grid to DC signals. The generator-side converter 210 converts the DC signals on the DC link 212 into variable AC signals for the generator 201. The reverse sequence of signal flow in the power converter 202 is also true for some signals. In the event that the wind turbine is operating at above synchronous speed, the electrical power generated by the generator is still supplied to the power grid 107 via the stator windings 220 but the flow of power in the power converter 202 is reversed. Power in the rotor windings 221 now flows from the generator to the power grid 107 via the power converter 202, to supplement the power from the stator windings 220.

During a power imbalance event, excess electrical power or energy may be generated by the generator 201. As mentioned earlier, the power imbalance event may be a voltage dip in the power grid 107 (low voltage event), a fault in the converter or when there is a sudden wind gust causing a sudden increase in the rotational speed of the blades of the wind turbine (wind gust event). According to the embodiment, a controller (not shown) detects the power imbalance event and activates the energy management arrangement 204.

This excess electrical energy is converted by the generator-side converter 210 into DC signals and placed on the DC link 212. Accordingly, the excess electrical energy charges the DC link 212, causing the DC link voltage to increase. Also in the event when there is a large voltage difference between the stator windings 220 and the power grid 107, for example during a low voltage event, a large current is produced in the stator windings. This large current in the stator windings 220 induces high voltages in the rotor windings 221 which also results in large currents being produced in the rotor windings 221. The large currents in the rotor windings 221 may damage the components in the power converter 202. The high current in the rotor windings 221 also charges up the DC link 212, resulting in the DC link voltage to increase.

Therefore, the controller may detect a power imbalance event by determining whether the voltage at the DC link 212 increases above a predetermined threshold level, or whether the current level at the DC link 212 or at the rotor windings 221 is above a predetermined threshold level. If the voltage and/or current at the DC link 112 or the current at the rotor windings 221 is determined to be above the predetermined threshold level, a power imbalance event is detected. As also mentioned earlier, the controller may also sense the voltage of the power grid 107 to determine whether there is any voltage dip, determine the wind speed on the turbine blades using wind anemometer or determine the rotational speed of the rotor to detect any power imbalance event.

When the controller has detected the power imbalance event, it activates the energy management arrangement 204 by controlling the switches SW1', SW2 and SW3'. The operation of the energy management arrangement 204 has already been described with reference to FIG. 2, and will not be repeated here.

It should be noted that the energy management arrangement 204 may also be coupled to the rotor windings 221 instead of the DC link 212 in another embodiment. In this embodiment, the energy management arrangement 204 may have a similar configuration as the energy management arrangement 140, 150 as shown in FIG. 4 and FIG. 5. Specifically, the electrical system in FIG. 6 then includes an AC-to-DC converter to convert the AC voltage at the rotor windings 221 to suitable DC voltage to be operated by the energy storage unit 221, the UPS 105 and the power dissipating resistor 222.

Figure 7:
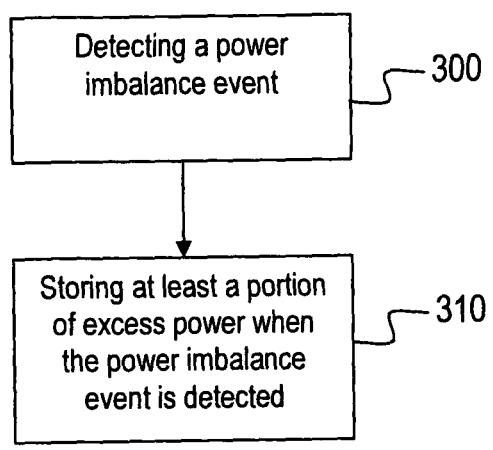
FIG. 7 shows a flow-chart of a method for operating the wind turbine according to an embodiment.

FIG. 7 shows a flow-chart of a method for operating the wind turbine according to this embodiment. Step 300 includes detecting a power imbalance event. As mentioned earlier, examples of power imbalance events include a low voltage event and a wind gust event. The power imbalance event may be detected by determining the voltage at a power grid, the voltage at a DC link of a power converter, the current level at the input of the power converter, the rotational speed of the rotor or the wind speed on the turbine blades using wind anemometer.

Step 310 includes storing at least a portion of excess electrical energy generated when the power imbalance event is detected. As mentioned earlier, the excess power can be stored in an energy storage unit of an energy management arrangement. The energy management arrangement may be coupled to the DC link of the power converter, or to the input of the power converter to receive the excess power therefrom.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A variable speed wind turbine, comprising:
    a generator;
    a power converter configured to convert at least a portion of electrical power generated by the generator;
    a dump load resistance coupled between the generator and power converter;
    an energy management arrangement coupled with the power converter and comprising an energy storage unit and a power dissipating element; and
    a controller configured to:
        upon detecting a power imbalance event, preferentially transfer a first portion of excess electrical energy generated by the generator to the energy storage unit; and
        transfer, when the energy storage unit has reached a fully charged state, a second portion of the excess electrical energy to at least one of the power dissipating element and the dump load resistance.

2. The variable speed wind turbine of claim 1, wherein the energy storage unit comprises at least one of an electrical, chemical, mechanical or electrostatic storage arrangement.

3. The variable speed wind turbine of claim 1, wherein the power converter is adapted to convert a full amount of electrical power generated by the generator.

4. The variable speed wind turbine of claim 1, wherein the power converter comprises:

a generator-side converter adapted to convert an alternating current (AC) signal from the generator to a direct current (DC) signal;
a grid-side converter adapted to convert the DC signal to an AC signal; and
a DC link between the generator-side converter and the grid-side converter,
wherein the energy management arrangement is coupled to the DC link for receiving at least a portion of the excess electrical energy during the power imbalance event.

5. The variable speed wind turbine of claim 4, wherein the energy management arrangement further comprises a DC-to-DC converter for converting the DC signal at the DC link to a DC signal suitable to be processed by the energy storage unit.

6. The variable speed wind turbine of claim 1, wherein the power converter comprises:
a generator-side converter adapted to convert an alternating current (AC) signal from the generator to a direct current (DC) signal;
a grid-side converter adapted to convert the DC signal to an AC signal; and
a DC link between the generator-side converter and the grid-side converter,
wherein the energy management arrangement is coupled to an input of the generator-side converter for receiving at least a portion of the excess electrical energy during the power imbalance event.

7. The variable speed wind turbine of claim 6, wherein the energy management arrangement further comprises an AC-to-DC converter for converting the AC signal at the input of the generator-side converter to a DC signal suitable to be processed by the energy storage unit.

8. The variable speed wind turbine of claim 6, further comprising a second energy management arrangement, wherein the second energy management arrangement is coupled to the DC link for receiving at least a portion of the excess electrical energy during the power imbalance event.

9. The variable speed wind turbine of claim 1, wherein the energy management arrangement dissipates at least a portion of the transferred excess electrical energy as power loss during the power imbalance event.

10. The variable speed wind turbine of claim 9, wherein the power dissipating element comprises a resistor.

11. The variable speed wind turbine of claim 9, wherein the power dissipating element is arranged in parallel to the energy storage unit.

12. The variable speed wind turbine of claim 1, further comprising an uninterrupted power supply (UPS) coupled to the energy management arrangement, wherein the UPS receives electrical energy from the energy management arrangement to be stored therein.

13. The variable speed wind turbine of claim 1, wherein the energy management arrangement is adapted to supply electrical power to auxiliary components in the wind turbine during the power imbalance event.

14. A method of operating a variable speed wind turbine comprising a generator and an energy management arrangement coupled therewith, the method comprising:
preferentially transferring, upon detecting a power imbalance event, a first portion of excess electrical energy generated by the generator to an energy storage unit of the energy management arrangement; and
transferring, when the energy storage unit has reached a fully charged state, a second portion of the excess electrical energy to at least one of a power dissipating element of the energy management arrangement and a dump load resistance coupled with the generator.

15. The method of claim 14, further comprising dissipating at least a portion of the transferred excess electrical energy as power loss through the power dissipating element during the power imbalance event.

16. The method of claim 14, further comprising transferring at least a portion of the transferred excess electrical energy from the energy management arrangement to an uninterrupted power supply (UPS) to be stored therein.

17. The method of claim 14, further comprising supplying electrical power to auxiliary components in the wind turbine by the energy management arrangement during the power imbalance event.

18. A variable speed wind turbine, comprising:
a generator;
a power converter configured to convert at least a portion of electrical power generated by the generator;
an energy management arrangement coupled with the power converter and comprising an energy storage unit;
an uninterrupted power supply (UPS) coupled with the energy management arrangement and configured to store electrical energy received from the energy management arrangement; and
a controller configured to, upon detecting a power imbalance event comprising a wind gust event, transfer at least a portion of excess electrical energy generated by the generator to the energy storage unit.

19. The variable speed wind turbine of claim 18, wherein the UPS is configured to supply electrical power to auxiliary components in the wind turbine during the power imbalance event.

20. The variable speed wind turbine of claim 18, further comprising an auxiliary transformer configured to provide electrical energy to the UPS.

* * * * *